United States Patent
Iverson

(10) Patent No.: US 6,412,142 B1
(45) Date of Patent: Jul. 2, 2002

(54) VEHICLE CARPET AFFIXATION DEVICE WITH MODIFIED HELICAL HOOK MEMBERS

(75) Inventor: David S. Iverson, Chicago, IL (US)

(73) Assignee: David F. MacNeil, Downers Grove, IL (US)

(*) Notice: Subject to any disclaimer, the term of this patent is extended or adjusted under 35 U.S.C. 154(b) by 0 days.

(21) Appl. No.: 09/750,807

(22) Filed: Dec. 28, 2000

Related U.S. Application Data

(63) Continuation-in-part of application No. 09/738,748, filed on Dec. 15, 2000.

(51) Int. Cl.[7] ............................................. A47G 27/04
(52) U.S. Cl. ....................................................... 16/4; 16/6
(58) Field of Search .......................... 16/4, 6, 8, 17.1; 248/217.2; 411/450, 457–460; 24/350, 354, 380, 357, 709

(56) References Cited

U.S. PATENT DOCUMENTS

| | | | |
|---|---|---|---|
| 931,023 A | * | 8/1909 | Albertoni et al. ............. 24/357 |
| 3,981,050 A | * | 9/1976 | Dauphinais .................. 24/354 |
| 4,403,895 A | | 9/1983 | Caldwell et al. |
| 4,878,792 A | | 11/1989 | Frano |
| 4,901,961 A | * | 2/1990 | Gish .............................. 16/8 |
| 5,003,664 A | * | 4/1991 | Wong ............................ 16/6 |
| 5,014,390 A | | 5/1991 | De Gastines |
| 5,195,857 A | | 3/1993 | Hiramoto |
| 5,390,887 A | * | 2/1995 | Campbell ................ 224/42.32 |
| 5,509,182 A | | 4/1996 | Nakanishi |
| 5,511,283 A | | 4/1996 | Hirose |
| 5,772,380 A | | 6/1998 | Cloud et al. |
| 5,775,859 A | | 7/1998 | Anscher |

FOREIGN PATENT DOCUMENTS

WO      WO 97/45291      12/1997

* cited by examiner

*Primary Examiner*—Chuck Y. Mah
(74) *Attorney, Agent, or Firm*—Piper Marbury Rudnick & Wolfe; Jefferson Perkins

(57) ABSTRACT

A vehicle floor mat affixation device includes at least two tines or hook members formed substantially on respective helical paths around an axis of the affixation device and ending in downwardly bent terminal portions with sharpened points. The preferably tempered stainless steel hook members are adapted to easily pierce vehicle floor carpeting and to be screwed into place. A reverse face of the affixation device includes a panel of releasable fastening material that is designed to mate with a similar panel of releasable fastening material in the vehicle floor mat. The present invention resists affixation device pull out and shear forces applied to the mat with respect to the carpeting on which the mat is placed, but nonetheless permits easy removal and replacement of the vehicle floor mat and of the affixation devices themselves.

23 Claims, 4 Drawing Sheets

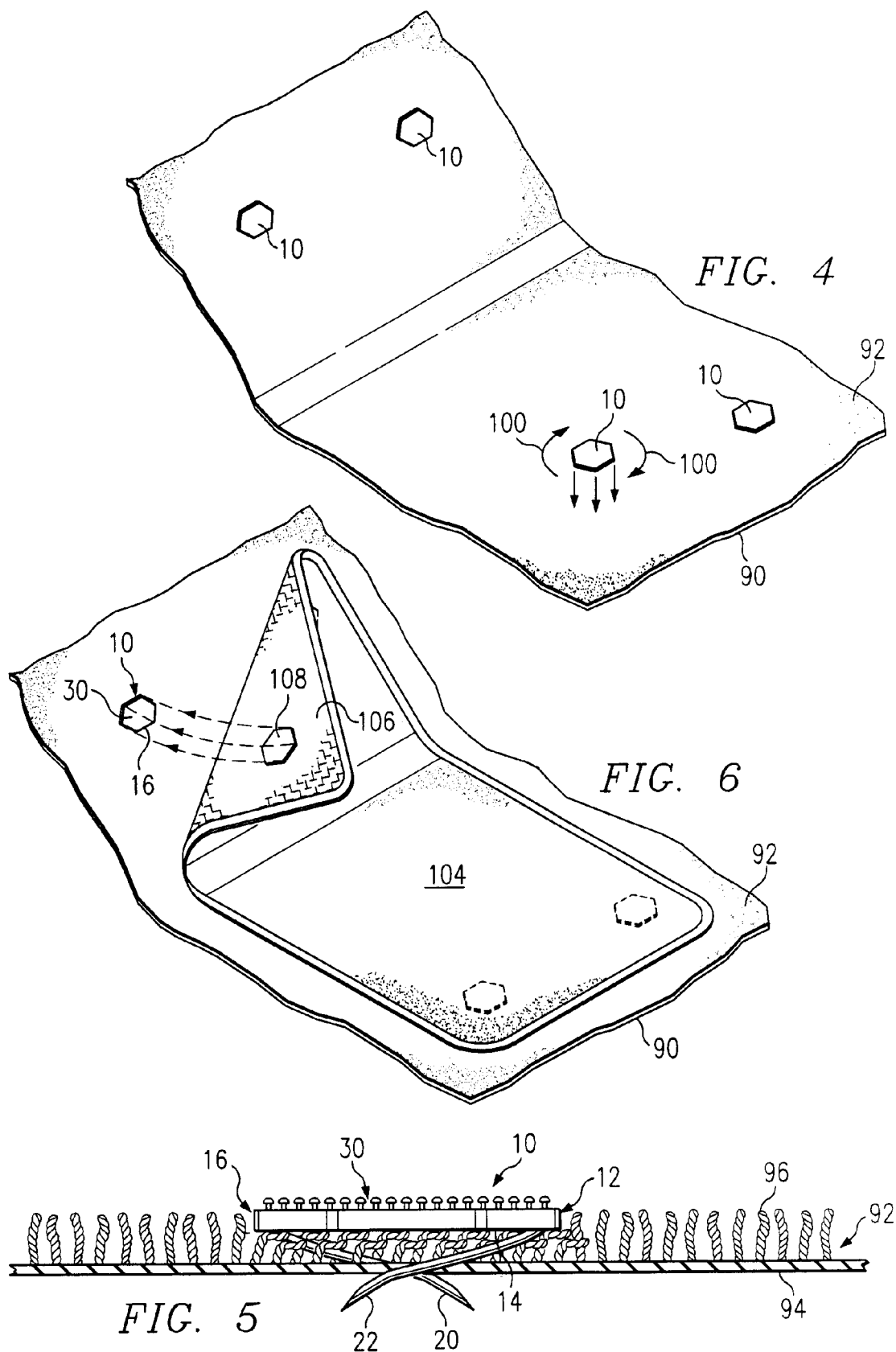

VEHICLE CARPET AFFIXATION DEVICE WITH MODIFIED HELICAL HOOK MEMBERS

CROSS REFERENCE TO RELATED APPLICATIONS

This application is a continuation-in-part of application Ser. No. 09/738,748 filed Dec. 15, 2000. The disclosure of that application is fully incorporated by reference herein.

TECHNICAL FIELD OF THE INVENTION

The present invention relates in general to fasteners, and more particularly to systems, devices and methods for releasably securing removable floor mats to the carpeted floors of vehicles.

BACKGROUND OF THE INVENTION

It has long been a practice to equip automobiles, sport utility vehicles, vans and even trucks with carpeting in the interior. While this creates an aesthetically pleasing interior and also aids soundproofing, it creates a problem in that occupants entering the vehicle from the outside will place their feet on the carpet, subjecting the carpet to soiling and accelerated wear.

To prevent the permanently installed carpeting from getting soiled and prematurely worn, vehicle manufacturers and manufacturers of after-market automotive products have developed floor mats that typically provide impervious barriers to moisture and dirt. These floor mats can be quickly removed, cleaned, replaced, and therefore the interior of the vehicle is preserved in a like-new condition.

The easy removability of conventional floor mats militates against their staying in one place on the carpet surface. To prevent the slipping and sliding of conventional vehicle floor mats on carpeted floors, various affixation devices have been developed. Representative of these is the affixation device shown in U.S. Pat. No. 4,403,895 issued to Caldwell et al. The Caldwell et al. device uses a central screw which is screwed into the carpeting pile, and a head which is meant to be received in a respective hole in a rubber floor mat. This conventional device and ones like it have a drawback of seriously and permanently damaging the carpet to which the affixation device has been joined. Further, since there is in essence only one point of attachment of this affixation device to the carpet, there is a tendency for this device to pull out of the carpeting when, for example, the floor mat to which it is affixed is suddenly jerked out of the vehicle, as might happen when a cleaning attendant wishes to quickly remove the floor mat. When this happens one is left with a gaping hole in the carpeting and a floor mat which is no longer securely affixable to the vehicle floor. A need therefore persists in the industry for a vehicle floor mat affixation device which (1) may be easily installed and removed by the consumer, (2) is not prone to causing damage to the carpeting if it is forcibly removed, and nonetheless (3) provides substantial resistance to slippage of the mat with respect to the floor.

SUMMARY OF THE INVENTION

According to one aspect of the invention, a device is provided for fastening an object to a textile layer, such as a layer of pile carpeting installed in a vehicle. This device has a plurality of elongate, resilient hook members that extend axially outwardly from a first face of a body. Each of the hook members is disposed in a helical path around an axis of a body. Free ends of the hook members are adapted to engage the textile layer. A second face opposite the first face has a fastener affixed thereto for fastening to the object. In the illustrated embodiment, this object is a vehicle floor mat, but it is contemplated that this device can be used for affixing various objects to various textile layers.

In a second aspect of the invention, the hook members are formed integrally with a crosspiece that is disposed in a nonlinear but planar path between the hook members. This crosspiece is incorporated into the body. The nonlinear path prevents a rotation motion of the hook members, in relation to the body, which could result in a less secure fastening of the object to the textile layer because of only one hook engaging the carpet. Preferably, reinforcing portions of the body cover the crosspiece to prevent the crosspiece from being pulled out of the body.

In a third aspect of the invention, the device is a portion of a system for releasably attaching the object to a textile layer. A second fastener is affixed to the object which is adapted to be releasably secured to the first fastener. In one preferred embodiment, the second face of the device is covered with a releasably fastening material such as VEL-CRO® (a hook and loop material made by DuPont) or even more preferably, DUAL-LOCK® (a releasably fastening material made by 3M). The second fastener comprises a layer of material which is bonded in some fashion to the object to be secured, such as a floor mat. Once the first and second layers of fastening material are mated together, the object is secured to the textile layer in such a manner that it will resist large shear forces between the object in the textile layer, and will require a moderate amount of force in the direction perpendicular to the textile layer to remove it. The hook members do little or no damage to the textile layer upon their insertion, are not easily inadvertently removed, but may be intentionally removed without leaving significant damage behind.

In an affixation method according to the invention, the helically disposed hook members of the affixation device are screwed into the carpeting pile such that the hook members pierce the underlying warp and woof of the textile layer. The helical path of the hook members is sufficiently spaced from the axis of the body that a significant portion of the textile layer resists the detachment of the body from the textile layer. This may be contrasted to conventional affixation devices of this type, which depend upon a very small central area to resist inadvertent extraction of the device.

In an alternative embodiment, the substantially helical hook members have terminal portions which are deflected axially outwardly with respect to the first face of the body. These deflected terminal portions are used to engage and pierce the textile layer more effectively prior to rotating the body of the device into position on the textile layer.

BRIEF DESCRIPTION OF THE DRAWINGS

Further aspects of the invention and their advantages may be discerned from the following description when taken in conjunction with the drawings, in which like characters number like parts and in which:

FIG. 4 is an isometric view of a portion of a carpeted vehicle floor, showing representative placement of several vehicle affixation devices;

FIG. 5 is schematic sectional view of a vehicle affixation device as installed into carpeting;

FIG. 6 is schematic illustration of a section of vehicle floor and an installed mat, showing how two surfaces of fastening material are mated together;

DETAILED DESCRIPTION OF ILLUSTRATED EMBODIMENT

Figure 1:
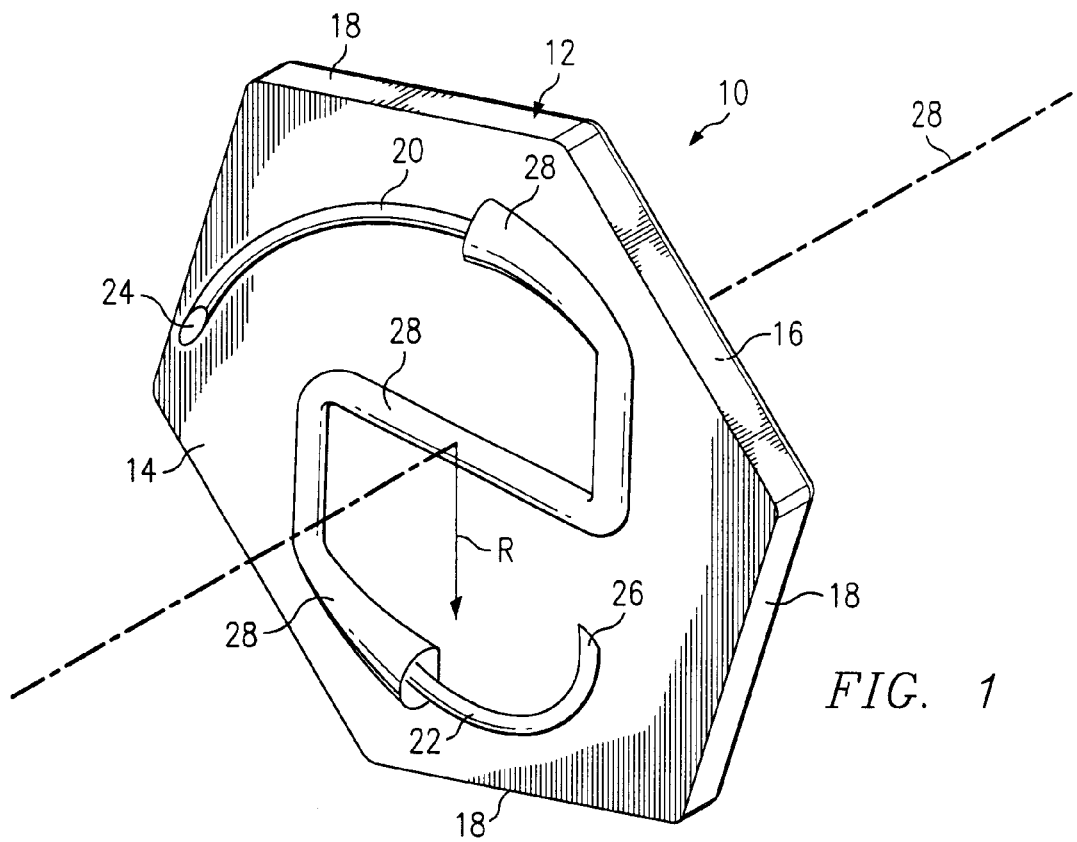
FIG. 1 is an isometric view of a vehicle affixation device according to the invention, particularly illustrating a first surface thereof.

In FIG. 1, a vehicle affixation device is indicated generally as 10 and has a body 12 that is relatively flat in aspect. The body 12 has a first surface 14 and a second or reverse surface 16 (see FIG. 2). In the illustrated embodiment, the body 12 has a series of sides 18 that are disposed between and join the surfaces 14 and 16. The sides 18 together form a hexagon and, as such, may receive a wrenching device. The device 10 may be in other than hexagonal form, but providing the device in a square, hexagonal or octagonal form forms opposed wrenching surfaces and therefore permits the application of a wrenching tool in order to install the device into a textile layer. Similarly, the provision of opposed wrenching surfaces 18 at the sides of the body 12 provides purchase for a wrenching tool for the nondestructive removal of the affixation device.

The body 12 of the affixation device is preferably formed of a thermoplastic material such as polystyrene, ABS, nylon or other plastic which is relatively tough, durable and inert from attack by dirt, water and grease. Protruding out of the relatively flat surface 14 are at least two hook members or tines 20 and 22. These hook members should be made of a material which is not easily permanently deformed but which exhibits a certain amount of elasticity. Likewise, hook members 20 and 22 should be formed of a material which is resistant to attack by substances likely to be deposited on the carpet, such as water, mud, grease, road tar and salt. Forming hook members 20 and 22 out of metal meets these requirements, particularly if the selected metal is steel, and most preferably if it is a high tensile strength stainless spring steel. For example, hook members 20 and 22 may be formed of pieces (or, as will be explained below, of a single piece) of stainless steel wire having a diameter of 0.025 to 0.060 inches, and more preferably, 0.047 inches. Respective free ends 24 and 26 of the hook members 20 and 22 are preferably sharpened in order to aid their piercing of the carpeting pile. Even more preferably, the ends 24 and 26 are sharpened only on the opposite side facing the surface 14, as this has been found to better entrain the hook members 20 and 22 onto a helical path as they are inserted into the carpeting pile. Alternatively, ends 24 and 26 may be sharpened to a needle point.

Importantly, the hook members 20 and 22 are formed to be substantially disposed on helical paths that are at a substantial distance from an axis 28 of the body 12. Axis 28 is at an angle to surface 14 and matches the pitch (or centerline) of 20. With vehicle carpeting, it has been found that the hook members should proceed about respective helical paths for approximately one third of a turn (120°) around the axis 28, and that the pitch of the hook member through this angle should be approximately one inch. The amount or distance of the helical path and the pitch may be varied according to the material that is used to form the hook members 20, 22 and the nature of the textile layer which the hook members 20 and 22 are designed to attach. For carpeting, a pitch that is as much as 1¼ inch or larger might work. The pitch must be chosen so that the textile layer to which the body 12 is to be affixed will be completely or at least substantially penetrated, but that the hook members 20 and 22 will not progress much beyond the textile layer. For thinner textile layers, the pitch would be less, while for thicker textile layers, the pitch could be made greater.

The use of high tensile strength spring steel to form the hook members 20 and 22 permits each of the hook members to have a very small entrance profile as the free ends 24 and 26 thereof pierce the textile. This forms extremely small holes which, in the case of conventional carpeting, would not exist at all given the relatively loose weave of typical carpet backing. Hence, the affixation of the body 12 to piled carpeting will cause almost no perceptible damage to the carpeting itself.

To maximize resistance against pullout, the tines or hook members 20 and 22 are substantially disposed on helical paths at a substantial radius R from the axis 28 of the body 12. In the illustrated embodiment, radius R is about 0.75 inches. Radius R should be chosen as to not be so large that the entire body 12 becomes unduly large, but yet not so small as to no longer be sufficiently resistant to pullout forces. As radius R increases, the exposed length of the hook members 20 and 22 becomes larger, and therefore their ability to grip the carpeting pile and underlying fabric layer is increased.

The molded plastic body 12 preferably further includes reinforcing portions 28. These reinforcing portions 28, which protrude from surface 14 in the illustrated embodiment and which are molded to cover an inwardly disposed crosspiece 56 (see FIG. 3) which in turn (in this embodiment) connects the hook members 20 and 22 together. These reinforcing portions are designed to lend further resistance against the pullout of the hook members 20, 22 from the body 12.

Figure 2:
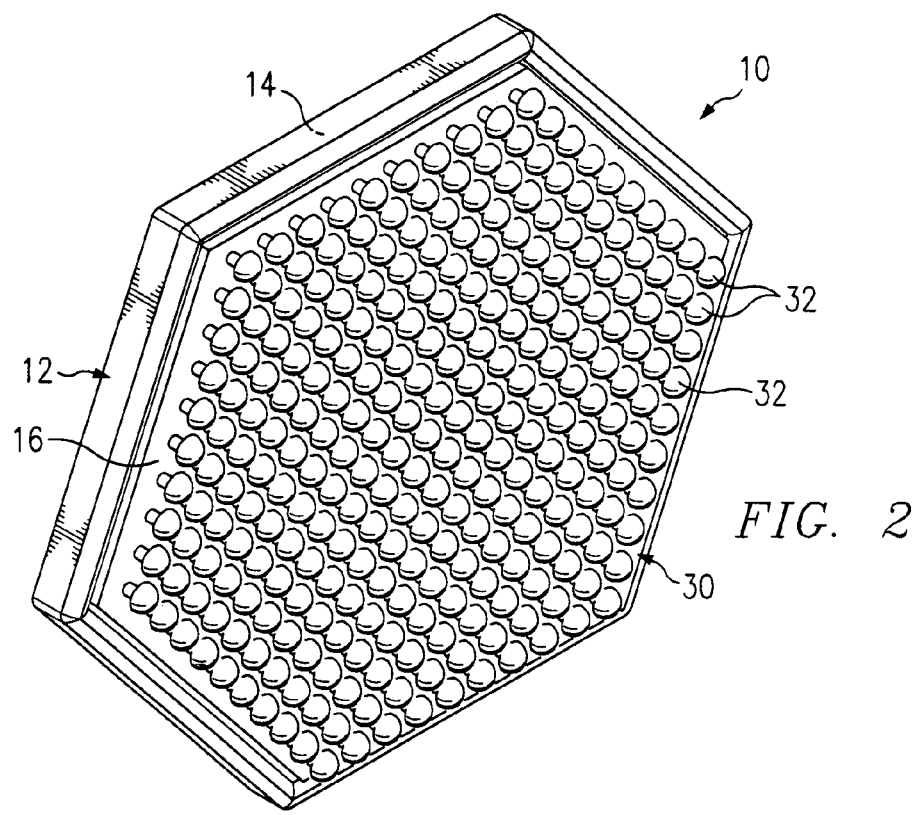
FIG. 2 is an isometric view of the vehicle affixation device shown in FIG. 1, illustrating a reverse or second surface thereof.

In FIG. 2, the second or reverse face 16 of the affixation device 10 is shown. Joined to or molded as a portion of the reverse face 16 is a fastener 30, which preferably is a piece of relatively flat, releasable fastening material, and even more preferably is a piece of DUAL-LOCK® releasable fastening material. The DUAL-LOCK® releasable fastening material takes the form of a two dimensional array of stalks formed to extend from a flat base and having enlarged ends. DUAL-LOCK® material is particularly preferred because of its property of permitting casual contact of one such piece of material with another such piece of material without binding to same. This permits a mating piece of DUAL-LOCK® material to be precisely placed over this piece 30 of the material, and only then pressed home to fasten the two pieces of material together. Other, less preferred forms of fasteners are VELCRO® or other hook and loop material or even metallic or rubber snaps. The DUAL-LOCK® material comes in various densities in the range of 180 to 400 stems per square inch. It has been found that for the application of affixing mats to carpeted vehicle floors, providing this material at a density of 250 stems per square inch works particularly well.

Figure 3:
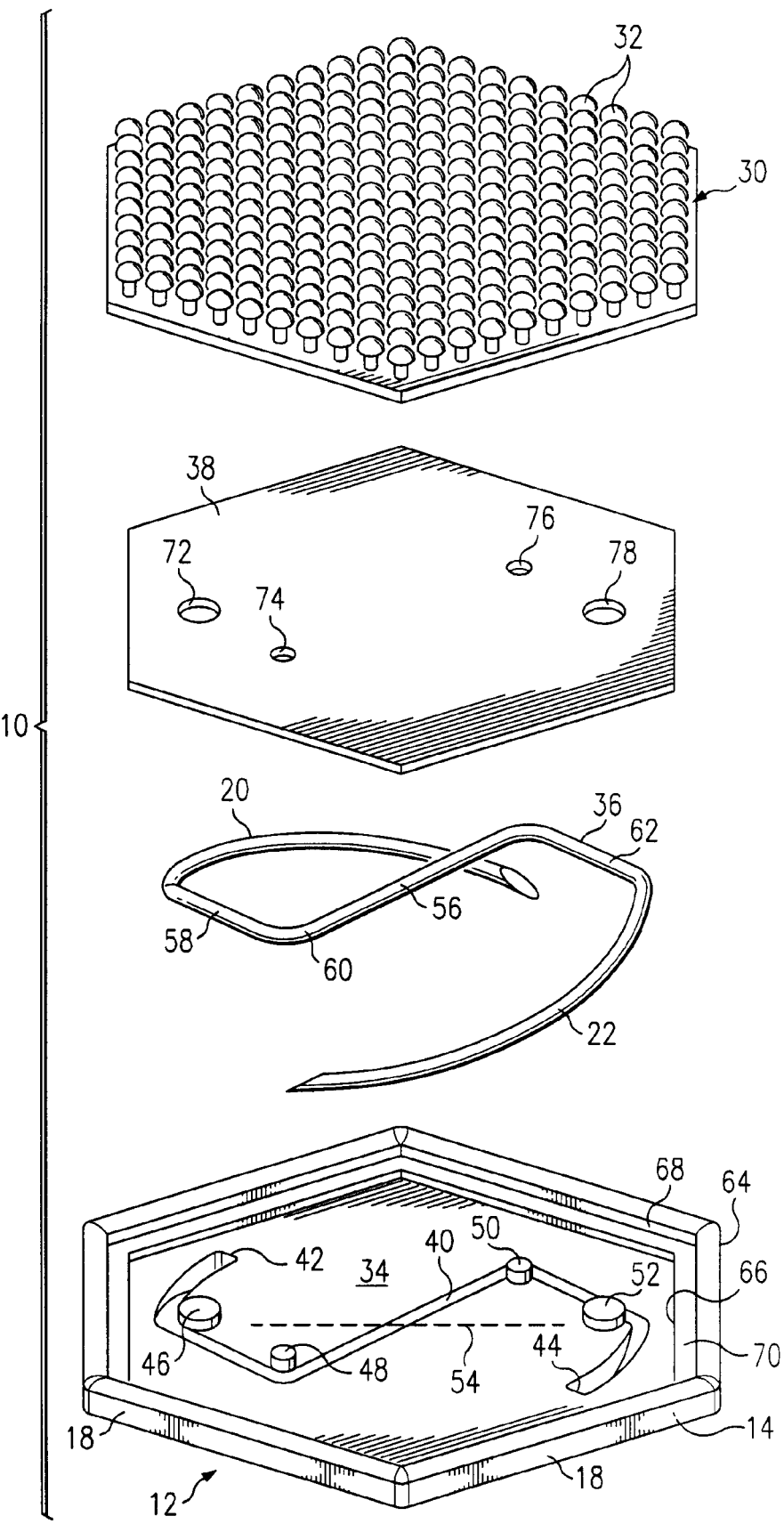
FIG. 3 is an exploded view of the vehicle affixation device, illustrating the subcomponents of the device and a method of assembly according to one embodiment of the invention.

FIG. 3 illustrates one method of assembling together the affixation device 10. In this assembly method, a first plastic piece 34 is provided which receives an integral stainless steel wire element 36, a second molded plastic piece 38, and a layer 30 of DUAL-LOCK® material. Piece 34 has formed therein a channel or track 40 into which the wire element 36 is placed. Holes 42 and 44 at the respective ends of the channel 40 permit hook members 20 and 22 to protrude through to the surface 14 (FIG. 1). Toward the holes or ends 42 and 44, the channel 40 takes respective sloping, helical paths, so as to conform to the helical configuration of the hook members 20 and 22.

The channel 40 is disposed about four protruding elements 46, 48, 50 and 52. These protruding elements permit the easy registration and assembly of the wire element 36 to the piece 34, and provide reinforcement of the corners of the wire piece 36.

The channel 40, and the wire element 36 that goes into it, are so configured as to have a nonlinear path within the plane occupied by piece 34. A lateral axis 54 in this plane is shown in dotted line. If the channel conformed to the axis 54, an undesirable rocking motion by the wire member 36 would be possible when the hook members 20 and 22 are engaged to carpeting pile or the like and the body 12 is then subjected to a force which has a component in parallel to axis 28 but which varies in magnitude between one side 18 and an opposed side 18. The linear crosspiece would rotate about axis 54 permitting the hook members to raise or lower with respect to surface 14 and possibly not allow either hook 20 or 22 to pierce the carpet. The nonlinear path taken by the channel 40 and the wire element 36 prevents this rocking motion and thereby enhances the ability of the hook members 20 and 22 to be retained within the fabric layer to which they are designed to be attached. Crosspiece 56 may join and be made integral with the hook members 20 and 22 and should have a nonlinear path which occupies substantially a single plane as described above. While various nonlinear paths may be used, in the preferred embodiment the nonlinear path taken by the crosspiece 56 includes a first segment 56 that departs from tine 20 at an approximately right angle, a second segment 60 which is formed at a right angle to the segment 58 and which proceeds across the axis of the body 12, and a third segment 62 formed at a right angle to the segment 56 and parallel to the segment 58, the segment 62 joining to tine 22 and segments 58, 60 and 62 residing in substantially the same plane.

After the integral spring wire piece 36 is placed within the channel 40 such that hook members 20 and 22 protrude out of face 14, the second plastic piece 38 is fitted on top of piece 34. Piece 34 has a circumferential lip member or sill 64 with a first, inner sidewall 66 and a second sidewall 68. A land 70 is formed between the vertical surfaces 66 and 68. This land 70 receives the periphery of the plastic piece 38. Plastic piece 38 has holes 72, 74, 76 and 78 that are fitted onto and receive, respectively, upstanding projections 46, 48, 50 and 52. Once the plastic piece 38 is fitted to the first plastic piece 34, the pieces are ultrasonically welded together, thereby containing the wire piece 36 inside of a plastic body. Alternatively, the wire piece 36 can simply be insert-molded with an integral plastic piece that would make up the body 12.

After the plastic piece 38 has been assembled to the piece 34, a circumferential vertical sidewall or lip 68 persists. A peal-off backing is removed from the DUAL-LOCK® releasable fastening material 30 and the piece 30, which has been cut or stamped so as to be the same shape as but slightly smaller than the circumferential lip 68, is applied to the upper surface of the plastic piece 38. This completes the assembly of the affixation device 10.

FIG. 4 is a schematic illustration of a portion 90 of a vehicle interior, particularly a driver or passenger side of an automobile floor. Typically, the floor 90 has affixed thereto a heavy duty carpeting, indicated by 92, that is relatively wear-resistant and impervious to various kinds of chemical attack. As best seen in FIG. 5, the carpeting 92 includes a backing or base textile layer 94 and a pile 96 formed of a mass of upstanding fibers. The floor portion 90 may have a relatively flat portion and a relatively sloped portion, as is shown.

In the use of the invention, where it is desired to releasably but firmly affix either a rubber or a carpeted mat to the floor portion 90, at least one and possibly several affixation devices 10 are affixed to the carpeting 92. This is done by simply screwing the affixation device 10 into the carpeting device 92; as the device 10 is pushed toward the carpeting 92, the piece is rotated as is shown by the arrows 100. At the end of this process, the affixation device 10 has its hook members 20 and 22 inserted into the carpeting 92, and in particular these hook members 20 and 22 have pierced the base layer 94 at two diametrically opposed locations. The upstanding pile layer 96 may be somewhat depressed underneath the body 12, and this is even desirable because device 10 will then not be apparent after the mat is place. Once device 10 is affixed to carpeting 92, the fastening material 30 is face up and is ready to receive the mat. If it ever becomes desirable to remove the affixation devices 10, this can simply be done by unscrewing them from the carpeting 92. The damage to the carpeting 92 will be virtually imperceptible because of the relatively small diameter of the hook members 20 and 22. But because, through the action of hook members 20 and 22, a relatively large amount of the carpeting 92 has been engaged, it will be very difficult to pull out any affixation device 10 without also rotating the device 10 in the opposite direction of affixing the device. The inadvertent removal of the devices 10, as by jerking out a mat to which the devices 10 are releasably attached, would be very difficult to do.

FIG. 6 is a schematic illustration of this same floor portion 90 after a vehicle mat 104 has been positioned on the carpeting 92. The vehicle mat 104 has affixed to its bottom surface 106 one, if not a plurality, of patches 108 that are formed of a releasable fastening material adapted to matably engage with the fastening material 30 of the affixation devices 10. Preferably, these patches 108 are made of DUAL-LOCK® material at the same density as that of material 30. In the illustrated embodiment, where the surface 106 is made of rubber or the like, the DUAL-LOCK® material 108 is affixed to the surface 106 using a special fixative such as 3M® 94 Primer which includes a mixture of cyclohexane, xylene, and ethanol. Other methods of joining or adhering a releasable material patch 108 to the underside of the mat 104 can be easily thought of. Because of the nature of the DUAL-LOCK® releasable material, the patch 108 can be carefully positioned with respect to the affixation device 10 so that an exact placement can be had before pressing home the patch 108 into the material 30. To remove the mat 104, one simply pulls the mat 104 up from the carpeting 92, whereupon the patch 108 will separate from the material 30. While the material 108 can be separated from the material 30 with a modest force that is perpendicular to their areas, the mated materials 30 and 108 will resist relatively large shear forces so that inadvertent movement of the feet or the like will not cause a shifting of the mat 104. A superior vehicle mat affixation system results.

Figure 7:
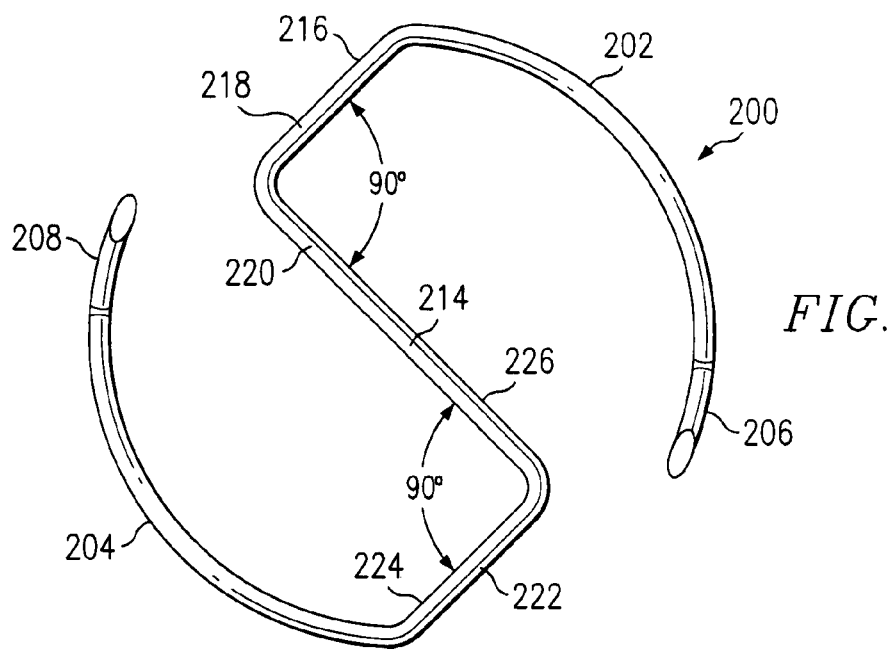
FIG. 7 is a plan view of hook members formed according to an alternative embodiment of the invention.
Figure 8:
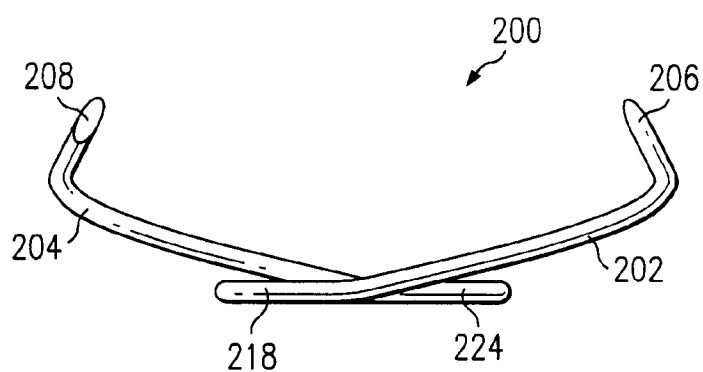
FIG. 8 is a first elevational view of the hook members shown in FIG. 7.
Figure 9:
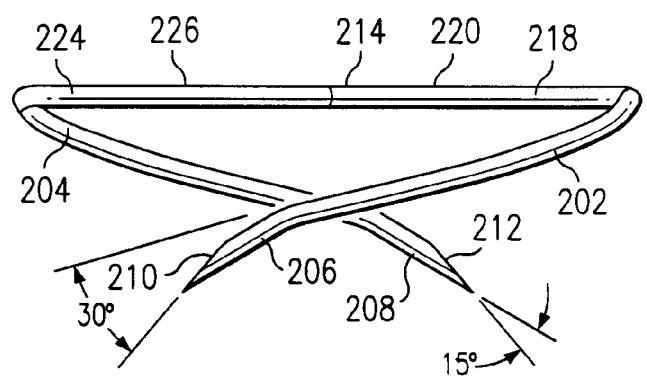
FIG. 9 is a second elevational view of the hook members shown in FIG. 7.

FIGS. 7–9 illustrate an alternative wire element 200 which may be employed in the invention in the place of wire element 36 shown in FIGS. 1 and 3, for example. As before, the wire element 200 has helical hook members 202 and 204 which substantially conform to helical paths. However, each of the hook members 202, 204 terminate in respective terminal portions 206 or 208 that are bent or deflected in an axial direction away from the body surface 14. This bending or deflection is best seen in FIG. 9. In one preferred embodiment, particularly suited for vehicle carpeting, the terminal portions 206, 208 are approximately 0.3 inches long and have been bent out of the otherwise helical path of the hook members 202 and 204 by approximately 30 degrees. The terminal portions 206 and 208 are further formed to be straight rather than curved in this embodiment. As before, terminal portions 206 and 208 are sharpened on faces 210 and 212, respectively, that face away from the carpeting.

While one embodiment of the hook members is shown to be unitary, with the hook members being connected together by a crosspiece and integrally made, this need not be the case. In another embodiment, a wire workpiece is sawed or cut approximately at a crosspiece midpoint 214 to create two separate hook members 202 and 204. These hook member workpieces are then sharpened individually. After sharpening the hook members 202 and 204 are assembled into a thermoplastic body as before. Hook member 202 will have a base portion 216 which has linearly connected, substantially coplanar portions 218 and 220. Similarly, hook member 204 has a base portion 222 which has linearly connected right angle portions 224 and 226 which are substantially coplanar with each other and with base portion members 218 and 220.

The downwardly deflected terminal portions of the hook members 202 and 204 provide a technical advantage for the following reason. As the user presses down on the body 12 each downwardly bent terminal hook member portion 206, 208 will be deflected by the textile layer, and as deflected the terminal hook portions 206, 208 will roughly conform to the original helical path that the rest of the hook members 202–204, in a noncompressed condition, occupy. The angle of attack set up by the helix pitch is therefore essentially preserved even while the user is exerting downward force on the body 12, which force is being resisted by the carpet pile. This force dramatically decreases when the penetration of the carpet pile is achieved, and therefore the rest of the hook member will not be axially compressed. Without the downwardly depressed portions 206 and 208, upon compression the tips of the hook members 202, 204 tend to flatten out so that the helix may be too flat, causing the angle of attack to be less than might be optimum. The bent portions 206, 208 are sufficiently short that there is not a great deal of bending moment exerted at their junction with the rest of the hook members 202, 204, and therefore there is not a lot of flexure at these points.

While the present invention has been illustrated with respect to a vehicle mat affixation system, the present invention has application to any situation in which an object is desired to be releasably affixed to a textile layer. For example, an affixation device, with suitable modifications concerning pitch and length of the helical hook members, can be used to affix objects to fabric walls of the type which exist in office cubicles or residences. The affixation device 10 or a variant of it can be used in any situation in which a relatively piercable layer is presented as a mounting surface, but where the layer is tear-resistant and is of limited thickness. The firmness by which the object is to be affixed to the fabric or textile layer may be varied by varying the number of stems per square inch of the DUAL-LOCK® material, or by substituting another set of releasable materials. Further, while the illustrated embodiment of the affixation device has two, diametrically opposed helical hook members that define segments through approximately one third of an axial revolution, and which are screwed into the carpet with a clockwise motion, other embodiments of this device could have more hook members and their pitch, length, or helical direction could be varied from that shown, depending on the conceived application.

Therefore, while the invention has been described with respect to the illustrated embodiment, it is not limited thereto, but only by the scope and spirit of the appended claims.

We claim:

1. A device for fastening an object to a textile layer, comprising:
   a body having a first face, a second face opposed to the first face, and an axis defined to be at an angle to the first face and the second face;
   a plurality of elongate, resilient hook members extending axially outwardly from the first face, each hook member spaced from, and substantially disposed in a helical path around, the axis, a terminal portion of each hook member departing from the helical path and deflected axially outwardly therefrom, each hook member terminating in a free end, the hook members adapted to engage the textile layer; and
   a fastener affixed to the second face for fastening to the object.

2. The device of claim 1, wherein the textile layer is carpeting.

3. The device of claim 1, wherein the hook members are steel.

4. The device of claim 3, wherein the hook members are stainless steel.

5. The device of claim 1, wherein the hook members include a pair of hook members having helical paths which are angularly separated by 180°.

6. The device of claim 1, wherein each hook member includes a base portion that is disposed in the body.

7. The device of claim 6, wherein the base portion of each hook member is formed to be nonlinear and disposed in a plane.

8. The device of claim 1, wherein the free ends of the hook members are sharpened.

9. The device of claim 1, wherein the body is formed of plastic.

10. The device of claim 9, wherein the body is formed of first and second pieces, the first piece including the first face and the second piece including the second face, the first and second pieces being matably assembled together.

11. The device of claim 1, wherein the fastener comprises a layer of releasable fastening material adapted for fastening to another layer of releasable fastening material.

12. The device of claim 11, wherein at least one of the layers of releasable fastening material comprises a plurality of upstanding stalks with enlarged heads.

13. The device of claim 1, wherein the terminal portions of the hook members are straight.

14. The device of claim 1, wherein each terminal portion of the hook members is deflected away from the hook member's helical path by an angle of about thirty degrees.

15. A system for releasably attaching an object to a textile layer, comprising:
   at least one affixation device having a body with a first face, a second face opposed to the first face and an axis formed at an angle to the first face, a plurality of helical hook members each substantially describing a respective helical path around, and spaced from, the axis and protruding from the first face, a terminal portion of each hook member departing from the helical path in an axially outward direction relative to the first face, a first fastener disposed on the second face; and at least one second fastener affixed to the object, the second fastener releasably securable to the first fastener.

16. The system of claim 15, wherein the first and second fasteners comprise layers of releasable fastening material adapted to be releasably fastened to each other.

17. The system of claim 15, wherein at least one layer of the releasable fastening material includes a two dimensional array of flexible stalks having front ends affixed to a base and second, enlarged ends opposed to the first ends.

18. The system of claim 15, wherein the textile layer is carpeting.

19. The system of claim 15, wherein the object is a mat.

20. The system of claim 15, wherein the hook members are formed of spring steel.

21. The system of claim 15, wherein the terminal portions of the hook members are straight.

22. The system of claim 15, wherein the terminal portions of the hook members are deflected away from the respective helical paths of the hook members by an angle of about thirty degrees.

23. A method of affixing an object to a textile layer, comprising the steps of:

positioning a first surface of an affixation device body adjacent an upper surface of the textile layer so as to present free ends of a plurality of hook members, each hook member upstanding from the first surface in a respective helical path but having terminal portions which depart from the helical path in an axial outward direction from the first surface, toward the upper surface of the textile layer;

pressing the affixation device toward the upper surface of the textile layer such that the terminal portions of the hook members penetrate the textile layer at a plurality of spaced-apart locations;

rotating the affixation device in a direction which is the same as the direction of the helical paths from the first surface of the affixation device to the terminal portions of the hook members, to secure the affixation device to the textile layer; and mating a fastener formed on a second surface of the affixation device which is opposed to the first surface thereof to a fastener on the object.

* * * * *